US012322826B2

(12) United States Patent
Chi et al.

(10) Patent No.: US 12,322,826 B2
(45) Date of Patent: Jun. 3, 2025

(54) BATTERY PACK AND VEHICLE COMPRISING SAME

(71) Applicant: LG Energy Solution, Ltd., Seoul (KR)

(72) Inventors: Ho-June Chi, Daejeon (KR); Jin-Yong Park, Daejeon (KR); Kyung-Mo Kim, Daejeon (KR); Kyung-Woo Kim, Daejeon (KR); Jeong-O Mun, Daejeon (KR); Jhin-Ha Park, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 544 days.

(21) Appl. No.: 17/765,237

(22) PCT Filed: Jul. 28, 2020

(86) PCT No.: PCT/KR2020/009953
§ 371 (c)(1),
(2) Date: Mar. 30, 2022

(87) PCT Pub. No.: WO2021/071071
PCT Pub. Date: Apr. 15, 2021

(65) Prior Publication Data
US 2022/0352591 A1  Nov. 3, 2022

(30) Foreign Application Priority Data

Oct. 8, 2019 (KR) .......................... 10-2019-0124812

(51) Int. Cl.
*H01M 50/26* (2021.01)
*H01M 50/211* (2021.01)
(Continued)

(52) U.S. Cl.
CPC ....... *H01M 50/264* (2021.01); *H01M 50/211* (2021.01); *H01M 50/24* (2021.01);
(Continued)

(58) Field of Classification Search
None
See application file for complete search history.

(56) References Cited

U.S. PATENT DOCUMENTS

| 2009/0145676 | A1* | 6/2009 | Takasaki | ............... | H01M 10/48 |
| | | | | | 180/68.5 |
| 2012/0156527 | A1 | 6/2012 | Kataoka | | |

(Continued)

FOREIGN PATENT DOCUMENTS

| CN | 101450605 A | 6/2009 |
| CN | 103035975 A | 4/2013 |

(Continued)

OTHER PUBLICATIONS

Search Report dated Sep. 12, 2023 from the Office Action for Chinese Application No. 202080062439.0 issued Sep. 13, 2023, 3 pages [See p. 1-2, categorizing the cited references].

(Continued)

*Primary Examiner* — Wyatt P McConnell
*Assistant Examiner* — Angela J Martin
(74) *Attorney, Agent, or Firm* — Lerner David LLP

(57) ABSTRACT

Provided are a battery pack with structural stability of battery modules and improved energy density, and a vehicle comprising the same. The battery pack according to the present disclosure includes at least one battery module and a pack case for receiving the battery module, the battery module including a battery cell stack including at least one battery cell, and a pair of end plates provided in close contact with front and rear sides of the battery cell stack on two sides of a lengthwise direction of the battery cell, and the pack case including a tray in which the battery module is mounted on an upper surface, and a top cover of which an outer periphery is coupled in contact with an outer periphery of the tray on the upper surface of the tray when the battery module (Continued)

is received inside, and wherein the end plates provide a mechanical support to protect the battery cell.

16 Claims, 13 Drawing Sheets

(51) Int. Cl.
*H01M 50/24* (2021.01)
*H01M 50/264* (2021.01)
*H01M 50/271* (2021.01)
*H01M 50/298* (2021.01)
*H01M 50/50* (2021.01)
*H01M 50/507* (2021.01)

(52) U.S. Cl.
CPC ....... *H01M 50/271* (2021.01); *H01M 50/298* (2021.01); *H01M 50/507* (2021.01); *H01M 2220/20* (2013.01)

(56) References Cited

U.S. PATENT DOCUMENTS

| | | |
|---|---|---|
| 2012/0301771 A1 | 11/2012 | Moser et al. |
| 2013/0089763 A1 | 4/2013 | Lee |
| 2014/0220391 A1* | 8/2014 | Fujii ................... H01M 50/264 429/7 |
| 2015/0140405 A1 | 5/2015 | Sakurai |
| 2017/0012330 A1 | 1/2017 | Kim et al. |
| 2017/0062783 A1 | 3/2017 | Kim et al. |
| 2017/0214013 A1 | 7/2017 | Benedict et al. |
| 2017/0313170 A1 | 11/2017 | Hara et al. |
| 2018/0040863 A1 | 2/2018 | Kim et al. |
| 2019/0291558 A1 | 9/2019 | Goto et al. |
| 2019/0305268 A1 | 10/2019 | Ryu et al. |
| 2019/0334217 A1 | 10/2019 | Yoon et al. |
| 2020/0067156 A1 | 2/2020 | Chi et al. |
| 2020/0203782 A1 | 6/2020 | Yoon |
| 2020/0411814 A1 | 12/2020 | Ju et al. |

FOREIGN PATENT DOCUMENTS

| | | |
|---|---|---|
| CN | 106486622 A | 3/2017 |
| CN | 108463903 A | 8/2018 |
| CN | 207818697 U | 9/2018 |
| CN | 109428025 A | 3/2019 |
| CN | 110100351 A | 8/2019 |
| CN | 209357807 U | 9/2019 |
| JP | 2006182295 A | 7/2006 |
| JP | 2013-510385 A | 3/2013 |
| JP | 2013229266 A | 11/2013 |
| JP | 201599650 A | 5/2015 |
| JP | 5910692 B2 | 4/2016 |
| JP | 2016046211 A | 4/2016 |
| JP | 6070046 B2 | 2/2017 |
| JP | 2017197047 A | 11/2017 |
| JP | 2019-506728 A | 3/2019 |
| JP | 6489194 B1 | 3/2019 |
| JP | 2019507469 A | 3/2019 |
| KR | 100298780 B1 | 9/2001 |
| KR | 20150049959 A | 5/2015 |
| KR | 20160132143 A | 11/2016 |
| KR | 101943489 B1 | 1/2019 |
| KR | 20190036245 A | 4/2019 |
| KR | 20190074759 A | 6/2019 |
| WO | 2011-027817 A1 | 3/2011 |
| WO | 2013-084756 A1 | 6/2013 |
| WO | 2018186566 A1 | 10/2018 |
| WO | 2019-088789 A1 | 5/2019 |
| WO | 2019124796 A1 | 6/2019 |

OTHER PUBLICATIONS

International Search Report for PCT/KR2020/009953 dated Oct. 29, 2020. 3 pgs.
Extended European Search Report including Written Opinion for Application No. 20875547.0 dated Feb. 8, 2023, pp. 1-8.

* cited by examiner

BATTERY PACK AND VEHICLE COMPRISING SAME

CROSS REFERENCE TO RELATED APPLICATIONS

The present application is a national phase entry under 35 U.S.C. § 371 of International Application No. PCT/KR2020/009953 filed on Jul. 28, 2020 which claims priority to Korean Patent Application No. 10-2019-0124812 filed on Oct. 8, 2019 with the Korean Intellectual Property Office, the disclosure of which is incorporated herein by reference in its entirety.

TECHNICAL FIELD

The present disclosure relates to a battery pack and a vehicle comprising the same, and more particularly, to a battery pack having a structure for mounting battery modules with space efficiency and a vehicle comprising the same.

BACKGROUND ART

As opposed to primary batteries that are non-rechargeable batteries, secondary batteries are rechargeable batteries, and they are used in not only mobile devices but also Electric Vehicle (EV) and Hybrid Electric Vehicle (HEV) running on electricity. Currently, widely used secondary batteries include lithium ion batteries, lithium polymer batteries, nickel cadmium batteries, nickel hydride batteries and nickel zinc batteries. The operating voltage of a unit secondary battery cell, i.e., a unit battery cell is about 2.5V to 4.6V. Accordingly, when higher output voltage is required, a battery pack is constructed by connecting battery cells in series. Additionally, a battery pack may be constructed by connecting battery cells in parallel according to the charge/discharge capacity required for the battery pack. Accordingly, the number of battery cells included in the battery pack may be differently set depending on the required output voltage or charge/discharge capacity.

When the battery pack is constructed by connecting battery cells in series/parallel, it is typical to form a battery module including at least one battery cell, preferably a plurality of battery cells, and construct a battery pack using at least one battery module with the addition of other elements. Here, the battery module includes the battery cells connected in series or in parallel, and the battery pack includes the battery modules connected in series or in parallel to increase the capacity and output.

FIG. 1 is a schematic diagram showing the battery module arrangement in the conventional battery pack, FIG. 2 is a cross-sectional view of the battery pack of FIG. 1 taken along the line II-II', and FIG. 3 is a cross-sectional view of the battery pack of FIG. 1 taken along the line III-III'.

FIG. 1 shows a total of 8 battery modules 20 arranged in a 2×4 matrix in the X direction (horizontal, the lengthwise direction of the battery module)×Y direction (vertical, the widthwise direction of the battery module) on the X-Y plane. To show the arrangement of the battery modules 20 more clearly, some elements are omitted.

Describing the battery pack 1 with reference to FIGS. 1 to 3, the battery modules 20 are mounted in a pack case 10, and protected by a crash beam 30 that is a rigid structure.

The pack case 10 includes a tray 12 and a top cover 14. The battery module 20 includes a plurality of battery cells 22 and a module housing 24 in which the battery cells 22 are received. The battery modules 20 are mounted on the tray 12 and the battery modules 20 and the tray 12 are fastened by a mounting bolt 40. The top cover 14 and the tray 12 are assembled with a sealing element 50 interposed between the top cover 14 and a sidewall 12a of the tray 12.

Since the battery module 20 includes the plurality of battery cells 22 in combination, when overvoltage, overcurrent or overheat occurs in some battery cells, a big problem occurs in the safety and operational efficiency of the battery module 20, and accordingly the means for detecting and controlling the overvoltage, overcurrent or overheat is necessary. Accordingly, a voltage sensor is connected to the battery cells 22 to monitor and control the operational condition in real time or at a regular time interval. The detection means is mounted or connected by a plurality of wires, and conventionally, a wire harness 60 including the wires is disposed between the battery modules 20 across the center of the battery pack 1.

The battery module 20 and the pack case 10 are separated from each other, and the battery module 20 is a basic unit of the battery pack 1, and it is a structure including the battery cells 22 disposed in the pack case 10 and protected by the rigid structure of the pack case 10. The pack case 10 is a rigid structure that protects the battery modules 20.

In the case of an electric vehicle, an unexpected impact and vibration may be applied to the battery pack 1 while driving. In this case, electrical connection between the battery modules 20 may be disconnected, or the pack case 10 that supports the battery modules 20 may be deformed. Accordingly, the battery pack especially for an electric vehicle needs durability that is high enough to withstand an external impact and vibration.

To meet the need, the battery modules 20 are arranged on the tray 12 at a predetermined distance d from the pack case 10 to protect the battery modules 20. To protect the battery modules 20 of the battery pack 1 from an external impact, there is a gap d to separate the area of the pack case 10 and the area of the battery module 20. However, not only is there a separate space for the mounting bolt 40 in the module housing 24 of the battery module 20, but also a space for maintaining the gap d is necessary, causing a loss of use of the internal space of the battery pack 1.

The crash beam 30 is used to increase the mechanical strength of the battery pack 1. Here, the crash beam 30 is a beam type structure installed in the tray 12 of the pack case 10, and may be provided between the plurality of battery modules 20 in all directions of the battery modules 20 including the left-right direction, up-down direction and front-rear direction. The tray 12 having the crash beam 30 has high shock resistance and is invulnerable to an external impact or vibration. However, the area occupied by the crash beam 30 and the gap d between the crash beam 30 and the battery module 20 reduce the space for mounting the battery modules 20. Moreover, when an essential component such as a cooling configuration, for example, a heat sink 70, is added, the floor area ratio or energy density of the battery pack 1 including the same will be lower.

Moreover, the tray 12 may sag S down due to the weight of the battery modules 20, and a space for a lower rigid structure for supporting the weight is necessary, causing a spatial loss.

Despite the practical difficulty of achieving the mechanical strength and energy density of the battery pack, recently there is a growing demand for battery packs satisfying the structural stability, cooling performance and high energy density requirements in the industrial field related to secondary batteries.

DISCLOSURE

Technical Problem

The present disclosure is designed to solve the above-described problem, and therefore the present disclosure is directed to providing a battery pack with structural stability of battery modules and improved energy density.

The present disclosure is further directed to providing a vehicle comprising the battery pack.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, a battery pack according to the present disclosure includes at least one battery module and a pack case for receiving the battery module, the battery module including a battery cell stack including at least one battery cell, and a pair of end plates provided in close contact with front and rear sides of the battery cell stack on two sides of a lengthwise direction of the battery cell, and the pack case including a tray in which the battery module is mounted on an upper surface, and a top cover of which an outer periphery is coupled in contact with an outer periphery of the tray on the upper surface of the tray when the battery module is received inside, wherein the end plates provide a mechanical support to protect the battery cell.

The end plates protect the battery cell from an impact applied to the front and rear sides of the battery cell stack.

In an embodiment, the battery module includes a busbar frame assembled on the front and rear sides of the battery cell stack, an insulating cover coupled to an outer side of the busbar frame and a side plate coupled to an outermost battery cell of the battery cell stack, and the end plates are a plate-shaped structure that covers the outer side of the insulating cover.

In the present disclosure, the battery pack may further include a sealing element interposed between the outer periphery of the tray and the outer periphery of the top cover coupled in contact with each other.

The top cover may have, at the outer periphery, a fastening extension portion that is bent and extends in an outward direction of the battery pack for fastening to the tray, and a fastening element may be inserted into the fastening extension portion.

Here, the tray may have, at the outer periphery, a step that is bent up from a mounting area of the battery module to match the fastening extension portion, and the step may be coupled to the fastening extension portion by the fastening element at a sidewall disposed on the step.

Also, here, any one of the pair of end plates may have a flange, the flange may be disposed at a height between the fastening extension portion of the top cover and the step of the tray so that the flange is placed on the sidewall, and a fastening element may be inserted into the flange.

Also, here, a fastening seat may be formed at the bottom of the other of the pair of end plates, and a fastening element may be inserted into a bracket installed in the tray through the fastening seat.

Preferably, a wire harness is disposed in a space between the top cover and the sidewall.

In particular, preferably, the pair of end plates are shared between the plurality of battery modules to integrally connect the plurality of battery modules.

In a specific example, the battery modules are arranged in a 2×n (n is 1 or greater) matrix in the X direction (the lengthwise direction of the battery cell)×Y direction on an X-Y plane, the battery modules placed side by side along the X direction are arranged such that terminals face each other, and the pair of end plates are shared between the battery modules placed along the Y direction.

In this case, preferably, the end plate placed on an outer side of the battery pack among the pair of end plates has a flange, the flange is disposed at a height between the fastening extension portion of the top cover and the step of the tray so that the flange is placed on the sidewall, a fastening element is inserted into the flange, a fastening seat is formed at the bottom of the end plate on an inner side of the battery pack among the pair of end plates, and a fastening element is inserted into a bracket installed in the tray through the fastening seat.

In another embodiment, the battery module further includes a busbar frame assembled on the front and rear sides of the battery cell stack, an insulating cover coupled to an outer side of the busbar frame, and a side plate coupled to an outermost battery cell of the battery cell stack, wherein the two battery modules are coupled by a center plate to form a large module, and at least one large module is included in the battery pack.

Preferably, at least two large modules are arranged in a direction, and the pair of end plates are shared on an outer side of the insulating cover to form a sub pack.

In this instance, two sub packs may be arranged along the lengthwise direction of the battery cell.

Preferably, an empty space is formed between adjacent large modules in the sub pack.

A pack side beam may be further coupled to an outer side of at least one of the pair of end plates.

The pack side beam may be a sidewall of the tray.

Furthermore, according to the present disclosure, there may be provided a vehicle comprising the battery pack. The vehicle may include an electric vehicle (EV) or a hybrid electric vehicle (HEV).

Advantageous Effects

According to an aspect of the present disclosure, there is provided a battery pack having a structure for mounting battery modules with space efficiency.

According to another aspect of the present disclosure, it is possible to increase the strength and floor area ratio of the battery pack. It is possible to increase the floor area ratio of the battery cell/battery pack by 9% or higher.

According to still another aspect of the present disclosure, two battery modules are treated as a unit of array, and the array is diversified through extension of one unit, thereby freely realizing the battery pack in various capacities.

BRIEF DESCRIPTION OF THE DRAWINGS

The accompanying drawings illustrate the embodiments of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
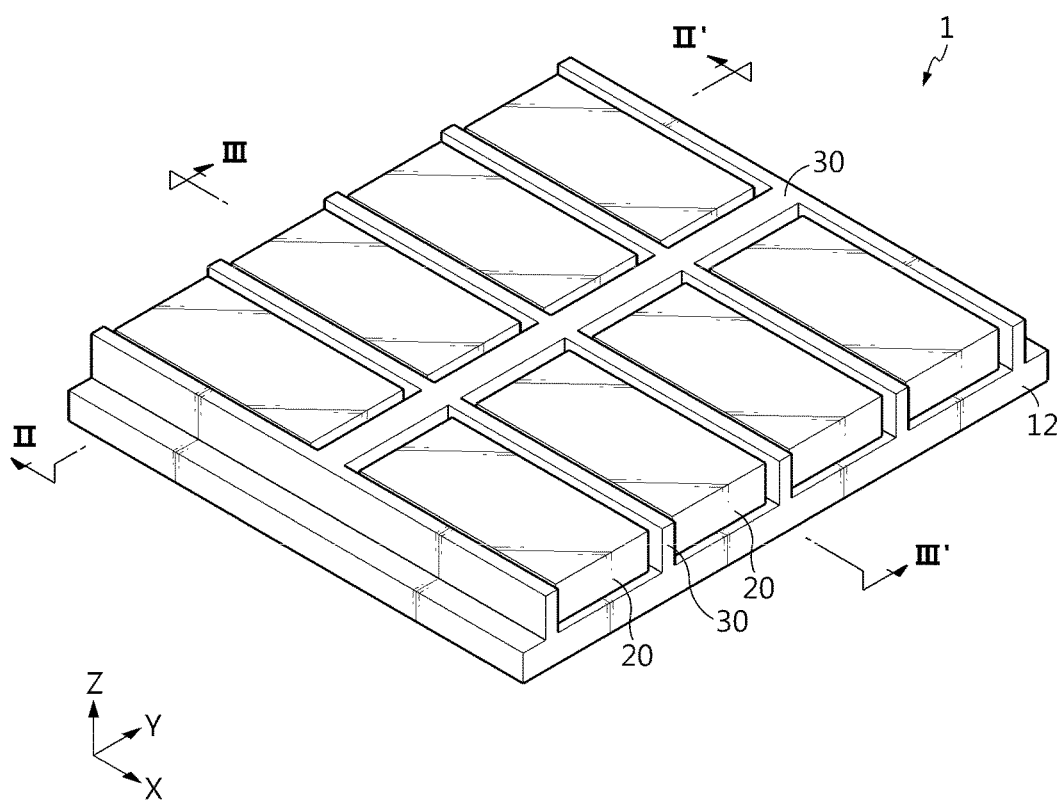
FIG. 1 is a schematic diagram showing the battery module arrangement in a conventional battery pack.

The present disclosure will be apparent by describing the preferred embodiments of the present disclosure in detail with reference to the accompanying drawings. It should be understood that the disclosed embodiments are provided for illustration purposes to help the understanding of the present disclosure, and the present disclosure may be embodied in a variety of different forms other than the disclosed embodiments. Additionally, to help the understanding of the present disclosure, the accompanying drawings are not shown in the actual scale, and some components may be exaggerated.

That is, the embodiments described herein and illustrations shown in the drawings are just a most preferred embodiment of the present disclosure, but not intended to fully describe the technical aspects of the present disclosure, so it should be understood that other equivalents and modifications could be made thereto at the time of filing the application.

Figure 4:
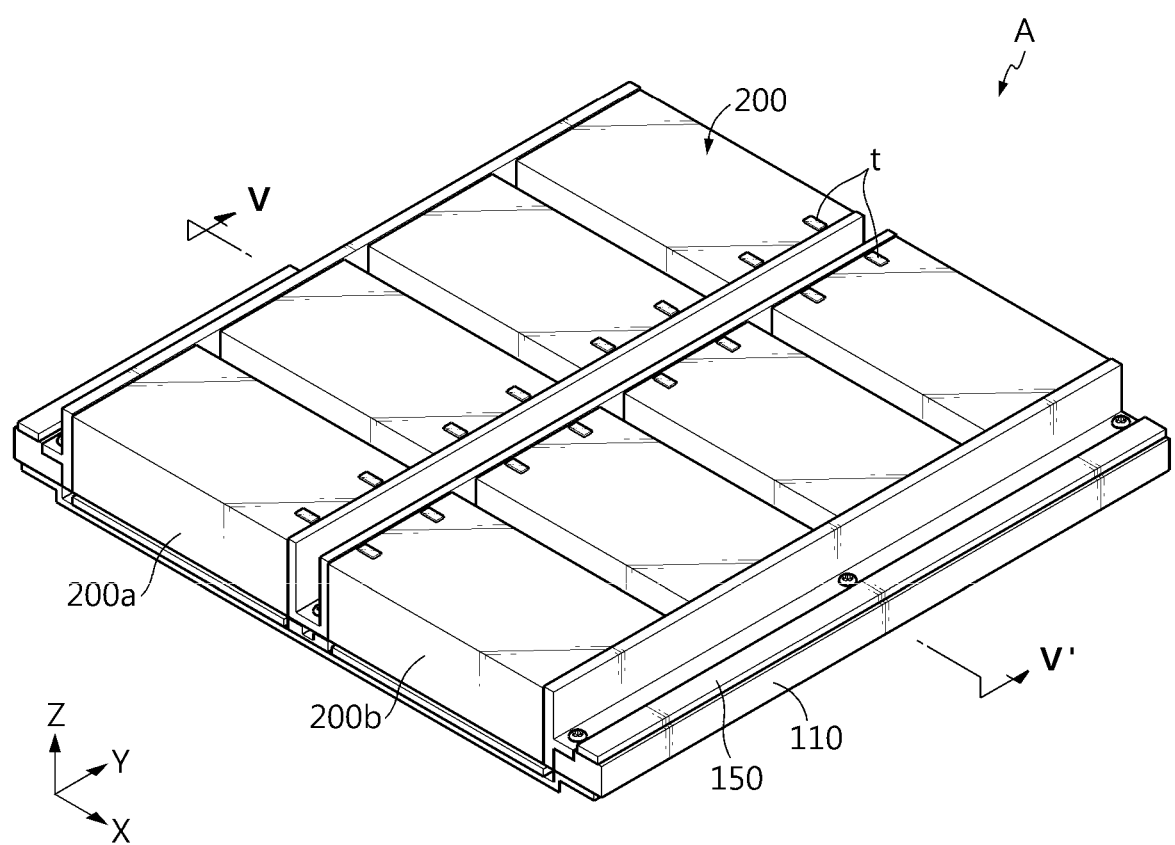
FIG. 4 is a schematic diagram showing the battery module arrangement in a battery pack according to an embodiment of the present disclosure.
Figure 5:
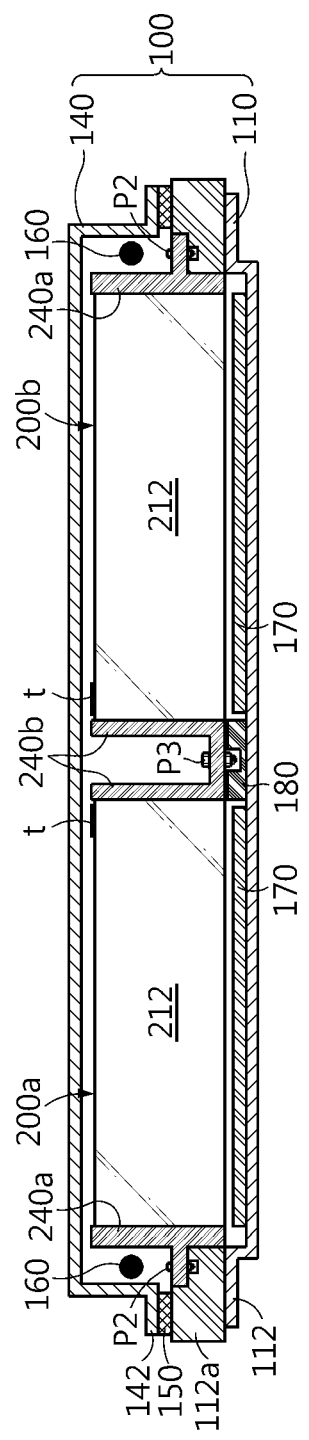
FIG. 5 is a cross-sectional view of the battery pack of FIG. 4 taken along the line V-V'.
Figure 6:
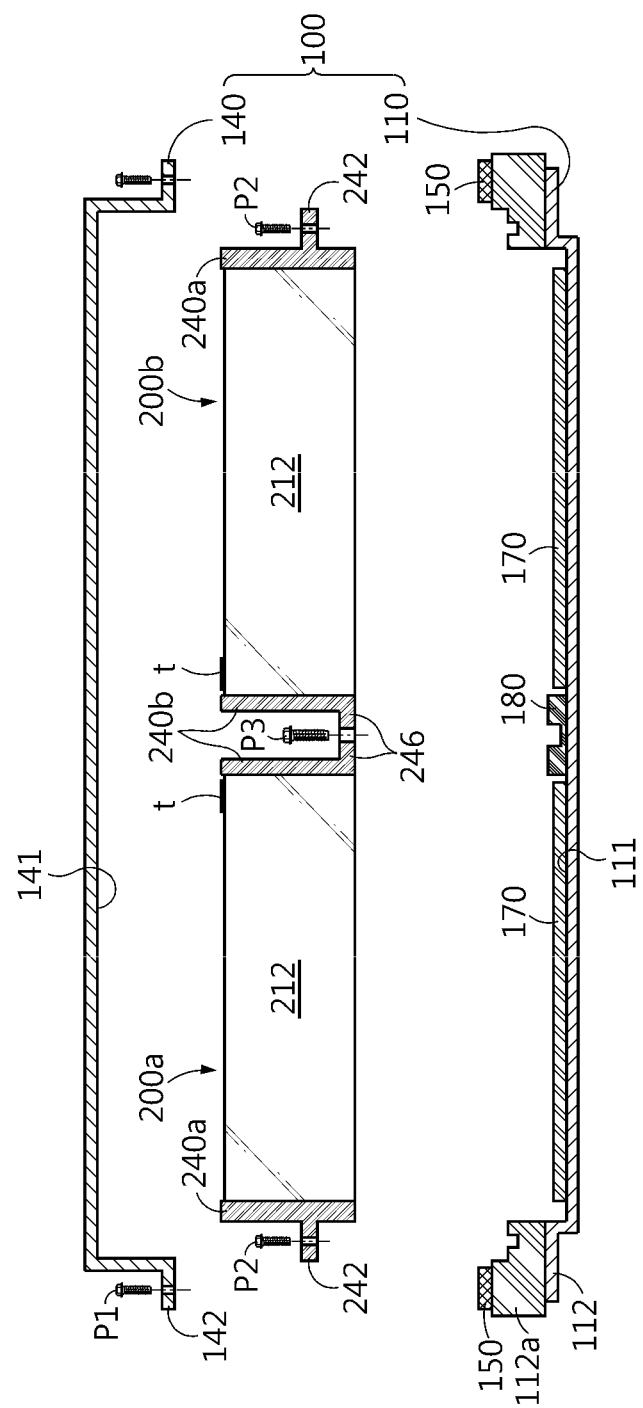
FIG. 6 is an exploded diagram of FIG. 5 before assembly.
Figure 7:
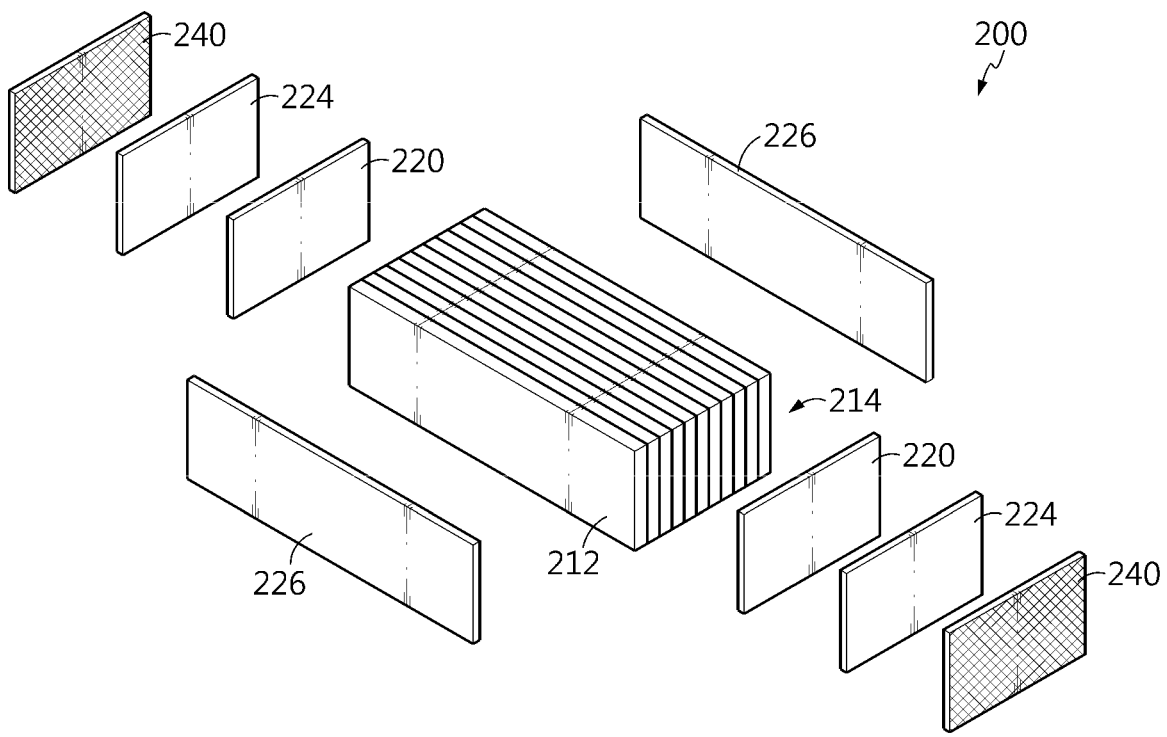
FIG. 7 is a diagram showing a battery module included in a battery pack according to an embodiment of the present disclosure.

FIG. 4 is a schematic diagram showing the battery module arrangement in a battery pack according to an embodiment of the present disclosure. FIG. 5 is a cross-sectional view of the battery pack of FIG. 4 taken along the line V-V'. FIG. 6 is an exploded diagram of FIG. 5 before assembly. FIG. 7 is a diagram showing the battery module included in the battery pack according to an embodiment of the present disclosure.

FIG. 4 shows an example of a total of 8 battery modules 200 arranged in a 2×4 matrix in the X direction (horizontal, the lengthwise direction of the battery module in which each column is defined)×Y direction (vertical, the widthwise direction of the battery module in which each row is defined) on the X-Y plane. However, the battery pack of the present disclosure is not limited to the arrangement of the battery pack A shown in FIG. 4. The battery pack of the present disclosure may have any modification to the specific structure of 2 rows and 4 columns depending on the required capacity and a structure in which the battery pack is mounted. Basically, the battery modules are arranged in 2×n (n is 1 or greater) matrix.

Meanwhile, the battery pack A may further include various types of devices (not shown) such as, for example, a Battery Management System (BMS), a current sensor and a fuse to control the charge/discharge of the battery modules 200. To illustrate the arrangement of the battery modules 200 more clearly, some elements are omitted in FIG. 4. The battery modules 200 include terminals t, and for example, the battery modules 200 disposed in the same column may be arranged such that the terminals t face each other. That is, the battery modules 200 placed side by side along the X direction may be arranged such that the terminals t face each other.

Describing the battery pack A according to an embodiment of the present disclosure with reference to FIGS. 4 to 7, the battery pack A includes at least one battery module 200 and a pack case 100 in which the battery modules 200 are received.

In the shown example, two battery modules 200 are mounted along the X direction in the pack case 100. For convenience of description, the battery module disposed on the left side in the drawings is referred to as a first battery module 200a, and the battery module disposed on the right side is referred to as a second battery module 200b. In FIG. 4, the first battery module 200a is in the first row, and the second battery module 200b is in the second row. Each battery module 200a, 200b does not use the crash beam that is the rigid structure provided in the tray, and instead, includes an end plate 240 having a similar, possibly equivalent, rigidity. Each of the battery modules 200a, 200b basically includes at least battery cell 212 and a pair of end plates 240 provided on two sides of the lengthwise direction the battery cell 212.

As shown in FIG. 7, in detail, the battery modules 200 may include a battery cell stack 214 including at least one battery cell 212, preferably, a plurality of battery cells 212, and various types of components. For example, the battery cell 212 may be a pouch-type secondary battery, and the plurality of battery cells 212 may be electrically connected to each other.

Although not shown, each battery cell 212 may include various components, for example, an electrode assembly, a battery case in which the electrode assembly is received and an electrode lead extending out of the battery case and electrically connected to the electrode assembly. The electrode lead may include a positive electrode lead and a negative electrode lead, the positive electrode lead may be connected to a positive electrode plate of the electrode assembly, and the negative electrode lead may be connected to a negative electrode plate of the electrode assembly. Additionally, in the case of a bidirectional battery, the positive electrode lead and the negative electrode lead may respectively extend to the two sides of the lengthwise direction of the battery cell 212. In the case of a unidirectional battery, the positive electrode lead and the negative electrode lead may extend to one side of the lengthwise direction of the battery cell 212 side by side. The positive electrode lead and the negative electrode lead are connected to each other through a connecting structure such as a busbar to electrically connect the plurality of battery cells 212.

The battery module 200 may further include a frame for stacking to stack and protect the pouch-type secondary batteries. The frame for stacking is the means for stacking the secondary batteries, and plays a role in not only holding the secondary batteries to prevent them from moving, but also stacking the secondary batteries to guide the assembly of the secondary batteries. For reference, the frame for stacking may be interchangeably used with a variety of other terms such as a cell cover or a cartridge.

In the case of a bidirectional battery, a busbar frame 220 may be assembled on the sides where the positive electrode lead and the negative electrode lead extend, i.e., the front and rear sides of the battery cell stack 214. The busbar frame 220 includes a busbar assembled with a frame, and is coupled to the electrode leads of the battery cells 212 to connect the battery cells 212. An insulating cover 224 may be further coupled to the outer side or face of the busbar frame 220. The insulating cover 224 may be made of a reinforced plastic having high electrical insulation and shock resistance.

Figure 2:
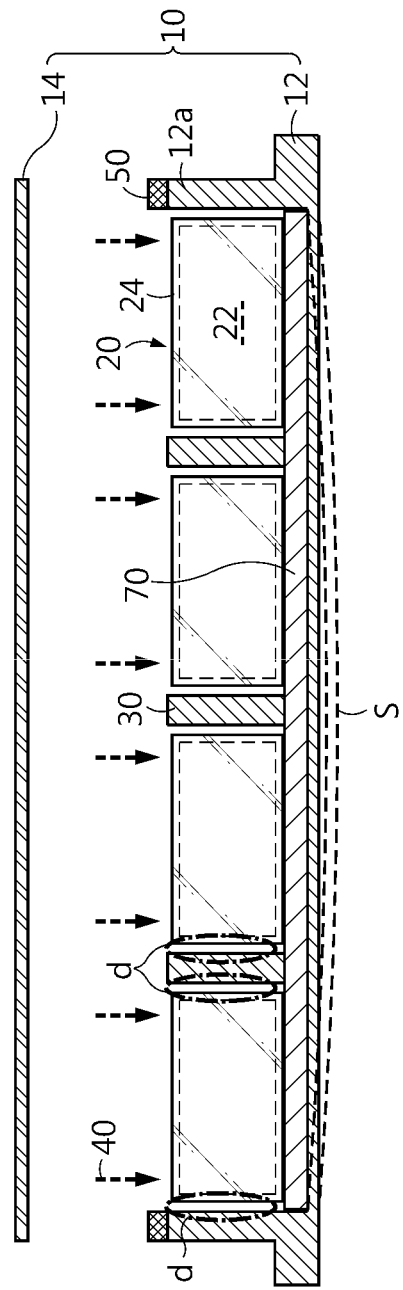
FIG. 2 is a cross-sectional view of the battery pack of FIG. 1 taken along the line II-II'.
Figure 3:
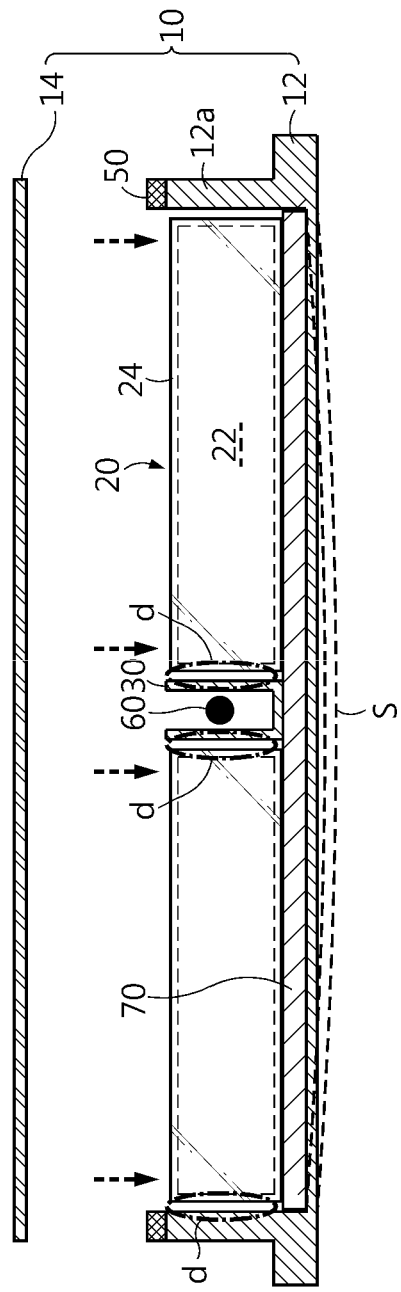
FIG. 3 is a cross-sectional view of the battery pack of FIG. 1 taken along the line III-III'.

A side plate 226 may be further coupled to the outermost battery cell 212 of the battery cell stack 214. The side plate 226 may be made of, for example, a metal such as aluminum (Al). All metals may be used, but in view of thermal conductivity, machinability and costs, steel or aluminum is desirable. Due to being lightweight, aluminum is especially desirable. As shown in FIGS. 2 and 3, the conventional battery module 20 requires the module housing 24 that wraps around the entire surface of the battery cells 22, but the battery module 200 included in the battery pack A according to an embodiment of the present disclosure covers the front and rear surfaces and the sides with the upper surface and the lower surface of the battery cell stack 214 being exposed to the outside, and this structure is advantageous to reduce the weight.

The end plates 240 are configured to protect and affix the battery cell stack 214 in the battery module 200, and a pair of end plates 240 may be provided on the two sides of the lengthwise direction in the battery module 200 while not affecting the electrically connected part between the plurality of battery cells 212. In this embodiment, the end plates 240 are provided in close contact with the front and rear sides of the battery cell stack 214. For convenience of description, in the drawings, among the pair of end plates 240, the end plate placed on the outer side of the battery pack A is referred to as a first end plate 240a, and the end plate placed on the inner side of the battery pack A is referred to as a second end plate 240b.

The end plates 240 may be individually provided for each battery module 200, and the end plates 240 may be shared between the battery modules 200 to integrally connect the plurality of battery modules 200. In an example, other first battery modules in front and rear of the first battery module 200a, i.e., battery modules in the first row arranged along Y direction in FIG. 4, may share a pair of end plates 240. Likewise, other second battery modules in front and rear of the second battery module 200b, i.e., battery modules in the second row arranged along Y direction in FIG. 4, may share a pair of end plates 240.

Preferably, the plurality of battery modules 200 shares the pair of end plates 240 to ensure structural integrity as one. Accordingly, it would be easy to handle the plurality of battery modules 200 and assemble the battery pack A.

The end plate 240 may be a plate-shaped structure that covers at least one surface of the battery cell stack 214 in the battery module 200, and in this embodiment, the outer side or face of the insulating cover 224. The end plate 240 is preferably made of a metal having high mechanical strength and thermal conductivity, and the end plate 240 may replace the crash beam of the conventional battery pack structure. That is, the end plate 240 provides the mechanical support to protect the battery cells 212. The end plate 240 may be made of a metal, for example, aluminum or steel and an extruded material, and other materials may be used.

The pack case 100 includes a tray 110 and a top cover 140. The battery modules 200 are mounted on the upper surface of the tray 110. A heat sink 170 may be placed on the tray 110 and the battery modules 200 may be mounted thereon. Due to the increased strength of the battery module 200 itself, it is possible to manufacture the pack case 100 included in the battery pack of the present disclosure with a slimmer design than the conventional pack case.

Although not shown, the battery module 200 may further include a cooling fin interposed between the battery cells 212. The cooling fin is a thin element having thermal conductivity such as aluminum, with the end extending outward, and is connected to a heat absorbing medium such as the heat sink 170 to transmit heat from the battery cells 212 to the outside.

The tray 110 provides a space in which the plurality of battery modules 200 is placed. The top cover 140 is configured to package and receive the plurality of battery modules 200 together with the tray 110.

The tray 110 and the top cover 140 may have a plate-shaped part having a generally wide area in mounting areas 111, 141 of the battery modules 200, and the cross section of the tray 110 and the top cover 140 may be a hat shape. The tray 110 and the top cover 140 are respectively disposed below and above the battery modules 200 to cover the lower part and the upper part of the battery modules 200, respectively.

The top cover 140 may have, at the outer periphery, a fastening extension portion 142 that is bent and extends in the outward direction of the battery pack A for fastening to the tray 110, and the fastening extension portion 142 may have a plurality of first holes into which a fastening element P1 is inserted. The fastening element P1 may include, for example, a bolt or a rivet, and it may be advantageous to use a bolt when taking each battery module 200 from the pack case 100 to repair.

The tray 110 may have, at the outer periphery, a step 112 that is bent up from the mounting area 111 of the battery module 200 to match the fastening extension portion 142 of the top cover 140. A sidewall 112a may be provided on the step 112. When the step 112 is high, the sidewall 112a may be omitted. The step 112 and the sidewall 112a may be a single component, or may be formed by coupling the components. The sidewall 112a may have a plurality of second holes in communication with the first holes of the fastening extension portion 142. The top cover 140 and the tray 110 may be coupled by inserting the fastening element P1 into the first holes and the second holes. The fastening element P1 may fix the top cover 140 and the tray 110 by applying the pressure to the fastening extension portion 142 of the top cover 140 and the step 112 and part of the sidewall 112a of the tray 110 on the upper surface of the top cover 140. Preferably, a sealing element 150 is interposed between the fastening extension portion 142 of the top cover 140 and the sidewall 112a on the step 112 of the tray 110. The outer periphery of the top cover 140 is coupled to the outer periphery of the tray 110 in contact with each other on the upper surface of the tray 110. The sealing element 150 is included in close contact between the outer periphery of the tray 110 and the outer periphery of the top cover 140 coupled in contact with each other. The sealing element 150 prevents a wire harness 160 from being exposed to water going through the side of the battery pack A.

Preferably, the first end plate 240a has a flange 242. The flange 242 may be disposed at the height between the fastening extension portion 142 of the top cover 140 and the step 112 of the tray 110 so that the flange 242 may be placed on the sidewall 112a. The flange 242 may have a third hole into which a fastening element P2 is inserted. Additionally, the sidewall 112a may have a fourth hole at an inner position of the battery pack A than the second hole, the fourth hole being in communication with the third hole of the flange 242. The first end plate 240a and the tray 110 may be coupled by inserting the fastening element P2. The fastening element P2 may include, for example, a bolt or a rivet, and it may be advantageous to use a bolt when taking each battery modules 200 from the pack case 100 to repair. The fastening element P2 may affix the flange 242 and the tray 110 by applying the pressure to the flange 242 and the step 112 and part of the sidewall 112a of the tray 110 on the upper surface of the flange 242. The size and height of the flange 242 may be adjusted to correspondingly fit or align with the sidewall 112a on which the flange 242 is placed.

A fastening seat 246 may be formed on the bottom of the second end plate 240b, and for example, the second end plate 240b and the tray 110 may be coupled by installing a bracket 180 at a location corresponding to the fastening seat 246 at approximately the center of the tray 110, and inserting a fastening element P3. The fastening element P3 may include, for example, a bolt or a rivet, and it may be advantageous to use a bolt to allow for removability when taking each battery module 200 from the pack case 100 to repair. The fastening element P3 may fix the second end plate 240b and the tray 110 by applying pressure to the fastening seat 246 and the bracket 180 on the upper surface of the tray 110.

Meanwhile, the tray 110 may be an assembly type tray by assembling the sidewall 112a and the bracket 180, or an integrally molded structure. In the case of integral molding, it is possible to reduce the number of components and the number of assembly processes, contributing to cost savings.

The pack case 100 may be made of plastic resin. In this case, pack case 100 may be produced by the injection molding process. In the injection molding, it is easy to form the fastening extension portion 142 of the top cover 140, the first holes, the step 112 of the tray 110, the sidewall 112a, the second holes and the fourth holes. The pack case 100 may be made by vacuum molding. That is, due to the simple cross section of the tray 110 and the top cover 140 in the shape of a hat, the shape may be formed through vacuum pressuring after placing the raw material of a solid sheet of uniform thickness on the mold.

The pack case 100 may be made of a metal, for example, steel such as high tensile steel. In this case, the pack case 100 may be produced by drawing type cold molding. Due to the simple cross section of the tray 110 and the top cover 140 in the shape of a hat, the shape may be formed through at least one drawing after placing the high tensile steel of uniform thickness on the mold. It is also contemplated that the pack case 100 may be formed by blow molding, compression molding, extrusion molding, etc.

Since the battery module 200 includes the plurality of battery cells 212 in combination, when overvoltage, overcurrent or overheat occurs in some battery cells, a big problem occurs in the safety and operational efficiency of the battery module 200, and accordingly the means for detecting and controlling the overvoltage, overcurrent or overheat is necessary. Accordingly, a voltage sensor is connected to the battery cells 212 to monitor and control the operational condition in real time or at a regular time interval. The detection means is mounted or connected by a plurality of wires, and as opposed to the conventional art, the present disclosure does not place the wire harness 160 including the wires at the center of the battery pack A between the battery modules 200, and may be disposed on each of the two outer sides of the battery modules 200. In particular, the wire harness 160 is disposed in a space between the top cover 140 and the sidewall 112a.

In the present disclosure, the end plates 240a, 240b of the battery module 200 replace the crash beam of the conventional battery pack. The flange 242 is applied to the first end plate 240a disposed at the outer side like a T-shaped structure, the outer periphery of the top cover 140 may be lowered down to the tray 110 accordingly. That is, the fastening extension portion 142 may be lowered down to meet the tray 110. The fastening element P1 may be fastened to that location. By this structure, the wire harness 160 may be disposed at each of the two outer sides of the battery modules 200.

Instead of the conventional pack case, the end plates 240 may play a role in providing the mechanical support for the battery modules 200, and protecting the battery modules 200 from an external impact. In particular, the end plates 240 may protect the battery cells 212 from impacts applied to the front and rear sides of the battery cell stack 214. The tray 110 and the top cover 140 may maintain a hermetic function as a cover.

Conventionally, rigidity is only provided to the pack case to protect the battery modules in the pack case, but the present disclosure gives rigidity to the battery modules 200 through the end plates 240. The end plates 240 of the battery modules 200 forms a rigid structure in each direction of the battery pack A.

According to the present disclosure, the battery modules 200 themselves form part of the rigid structure of the battery pack A, and may act as a structure of the battery pack A. The pack case 100 may maintain a hermetic function as a cover. Accordingly, it is possible to simplify the fabrication of the component/structure. According to the present disclosure, rigidity/space integration of the battery pack and the battery modules is achieved by integration of rigidity, and as a result of omitting the required gap between the pack case and the battery modules and the structure such as the crash beam, the highest floor area ratio effect is provided, which minimizes the amount of open space within the battery pack and battery modules to secure the components in place.

Figure 8:
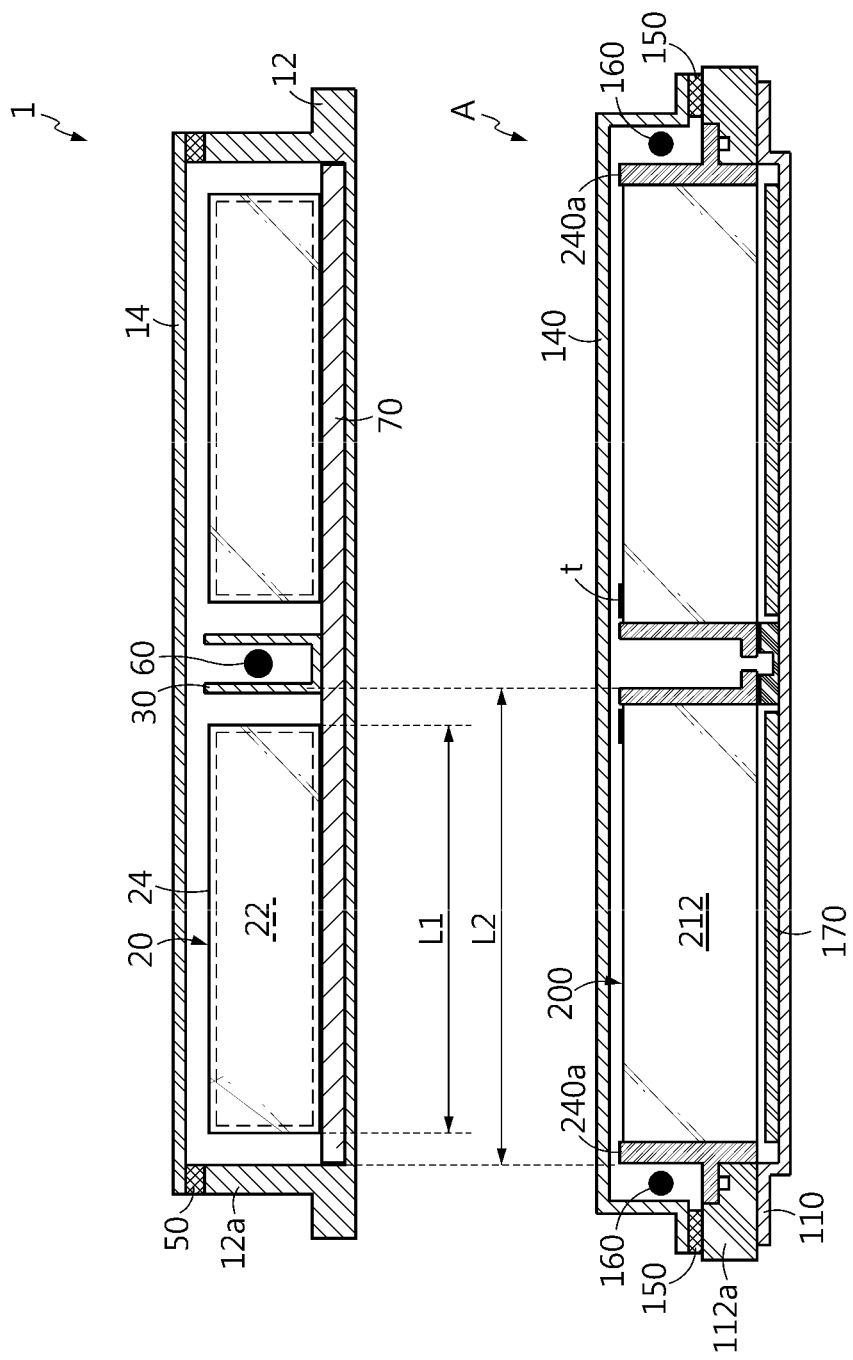
FIG. 8 is a diagram showing a comparison between the conventional battery pack and a battery pack according to an embodiment of the present disclosure.

FIG. 8 is a diagram showing a comparison between the conventional battery pack 1 and the battery pack A according to an embodiment of the present disclosure.

When comparing the positions of the sealing elements 50, 150, the sealing element 150 of the battery pack A according to an embodiment of the present disclosure may be disposed at the outer lower location than the conventional battery pack 1. Conventionally, the wire harness 60 is integrally disposed between the battery modules 20, but in the present disclosure, the wire harness 160 is disposed on each of the two outer sides of the battery modules 200.

Conventionally, the sealing element 50 is disposed on top of the sidewall 12a of the pack case. Since the sealing element 50 occupies some areas to perform a hermetic function, it is difficult to reduce the size of the sidewall 12a that supports the sealing element 50. With the flange 242 of the end plates 240, the present disclosure may lower the location of the sealing element 150. Accordingly, a new empty space is created between the top cover 140 and the sidewall 112a. Conventionally, the wire harness 60 is (integrally) placed between the crash beams 30, requiring a large central empty space. In the present disclosure, the wire harness 160 is placed on each of the two outer sides and disposed at a new empty space created between the top cover 140 and the sidewall 112a. Accordingly, it is possible to reduce the empty space at the center inside the battery pack A. When the size of the battery packs 1, A is the same, it is possible to make the size of the battery module 200 larger than the battery module 20. In particular, in the present disclosure, the end plates 240a, 240b of the battery module 200 replace the crash beam 30 of the conventional battery pack 1, so it is possible to make use of a space created by eliminating the crash beam 30 disposed at the center of the battery pack 1. Accordingly, as shown in FIG. 8, when the length of the conventional battery module 20 is L1, the length of the battery module 200 according to the present disclosure is L2, and when comparing L1 with L2, it can be seen that it is possible to significantly increase the space of the battery modules 200.

According to the present disclosure, it is possible to easily fix and mount the battery modules 200 on the tray 110 using the end plates 240 and the fastening elements P2, P3, and increase the mechanical strength of the battery modules 200 through the end plates 240.

Additionally, it is possible to efficiently make use of the space in which the wire harness 160 is placed in the pack case 100. Accordingly, it is possible to mount the battery modules 200 in the battery pack A with space efficiency, thereby improving the space utility. As the length L2 of the battery module 200 increases, it is possible to increase the space for the battery modules 200, thereby increasing the floor area ratio of the battery pack A, i.e., reducing the amount of empty or unoccupied space within the battery pack.

Hereinafter, a battery pack according to another embodiment of the present disclosure will be described with reference to FIGS. 9 to 12. In the drawings and description, the same reference numerals are given to the same elements as the previous embodiment, and redundant description is omitted herein.

Figure 9:
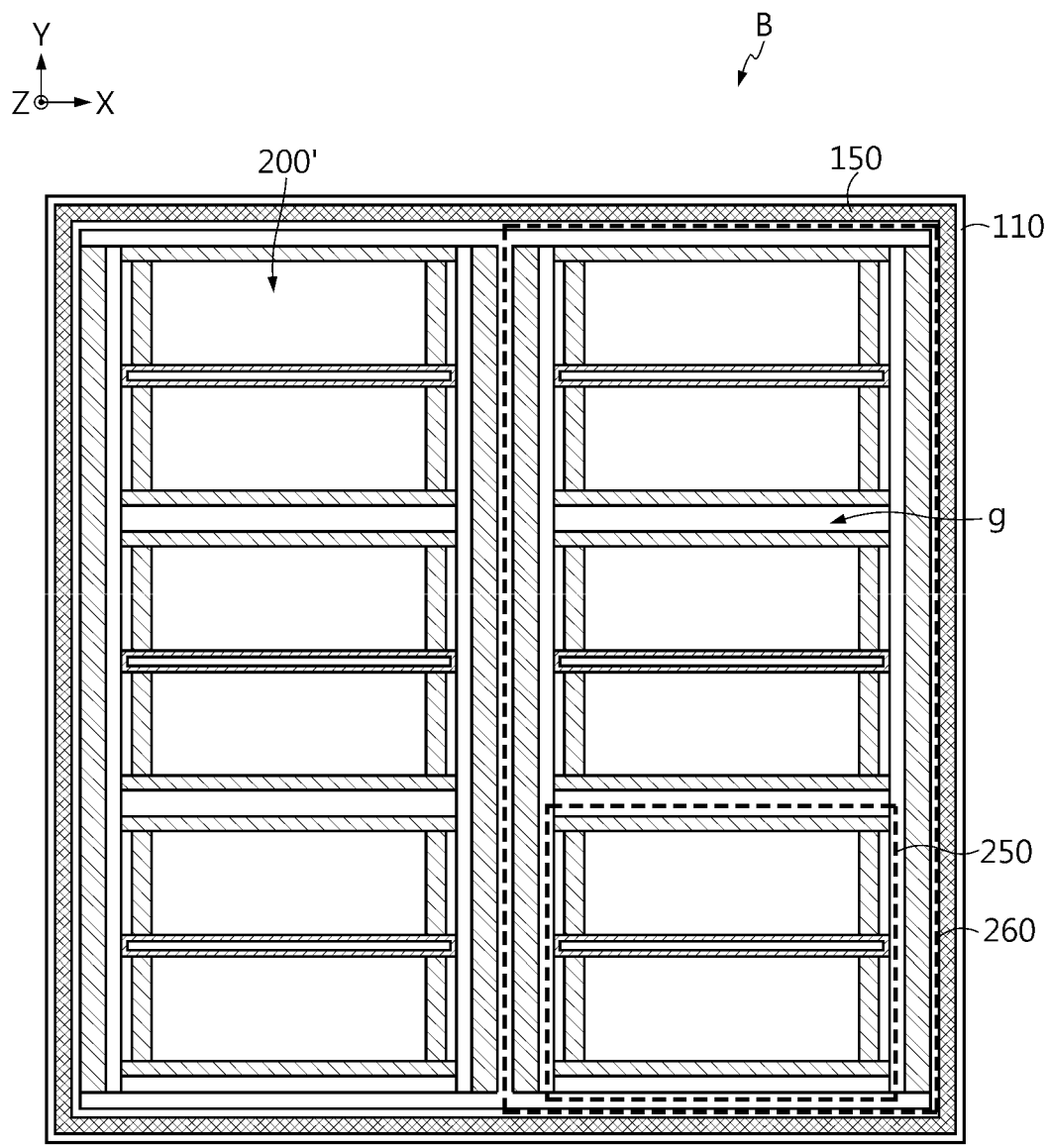
FIG. 9 is a top view of a battery pack according to another embodiment of the present disclosure.

FIG. 9 is a top view of another battery pack according to another embodiment of the present disclosure.

Referring to FIG. 9, the battery pack B includes battery modules 200' arranged in a 2×6 matrix having two more columns than FIG. 4. The battery modules 200' are placed on the tray 110. The sealing element 150 is placed on the outer periphery of the tray 110. The sealing element 150 is, for example, a gasket.

Figure 10:
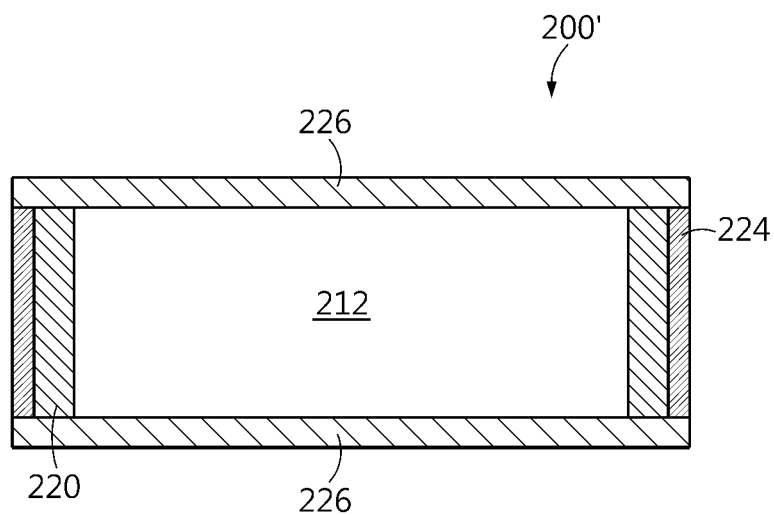
FIG. 10 is a diagram showing a battery module included in the battery pack of FIG. 9.

FIG. 10 is a diagram showing the battery module included in the battery pack of FIG. 9.

Referring to FIG. 10, in the same way as the battery module 200, the battery module 200' includes the battery cell 212, the busbar frame 220, the insulating cover 224 and the side plate 226.

Figure 11:
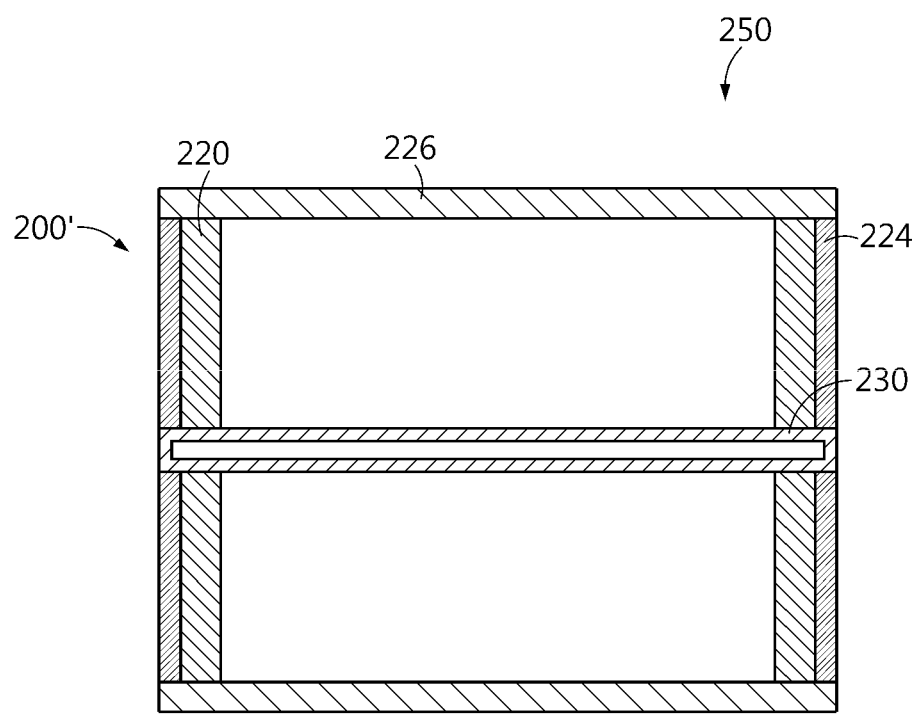
FIG. 11 is a diagram showing a large module including two integrated battery modules of FIG. 10.

FIG. 11 shows a large module 250 including two integrated battery modules 200' of FIG. 10. The large module 250 may include two battery modules 200' arranged side by side in the Y direction. The large module 250 may include a center plate 230 including an empty space between the two battery modules 200'. The center plate 230 may play a role in coupling the two battery modules 200' while keeping them spaced a uniform distance apart from each other. The center plate 230 includes an empty space, and may play a role in absorbing cell swelling during a contraction of the space.

The conventional battery pack 1 includes a plurality of battery modules 20 by the unit of the battery module 20, while in the battery pack B according to another embodiment of the present disclosure, the two battery modules 200' coupled by the center plate 230 forms a large module 250 as a basic unit. Accordingly, double battery cells may be a basic unit of an array. For example, when one battery module 20, 200', includes 24 battery cells, the large module 250 includes 48 battery cells.

Figure 12:
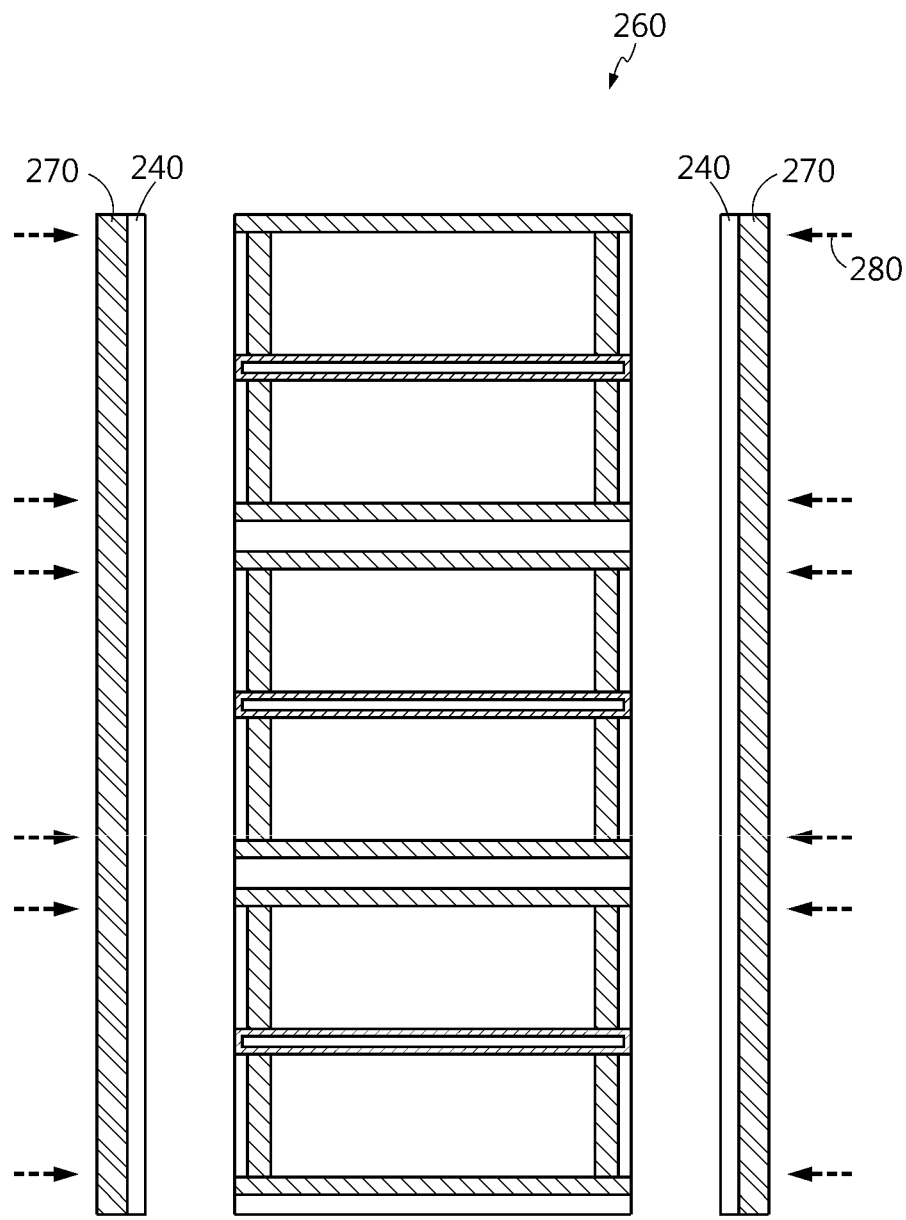
FIG. 12 is a diagram showing a sub pack including three integrated large modules of FIG. 11.

FIG. 12 is a diagram for describing a sub pack 260 including the integrated large modules 250 of FIG. 11.

The sub pack 260 may include at least two large modules 250 arranged in a direction, and in this embodiment, in the Y direction. In this embodiment, for example, to complete a 2×6 arrangement, three large modules 250 may be arranged. That is, the sub pack 260 is an extension of the large module 250 that is a basic unit of an array. The sub pack 260 is an integration of six battery modules 200'. The sub pack 260 has an empty space g between the adjacent large modules 250 (see FIG. 9). Accordingly, when an external impact is applied to the battery pack B, the impact is scarcely transmitted into the battery modules 200' across the large modules 250, thereby preventing the battery module 200' from being damaged. Additionally, due to the empty space g, when an event, for example, a fire, occurs in one large module 250, it is possible to prevent the fire from spreading to the other large module 250, thereby ensuring the safety of the battery pack B while in use.

In the large modules 250 arranged along the Y direction, the pair of end plates 240 are coupled on two sides along the Y direction. The previous example describes that the plurality of battery modules 200 shares the pair of end plates 240, and that is the example. The pair of end plates 240 are shared on the outer side of the insulating cover 224 of each battery module 200'. Here, to reinforce rigidity, an example is presented in which a pack side beam 270 may be further coupled to at least one of the pair of end plates 240. In particular, the pack side beam 270 placed on the outer side of the battery pack B may be the sidewall 112a of the tray 110 mentioned in the previous embodiment. The pack side beam 270 and the sidewall 112a may co-exist, or the pack side beam 270 and the sidewall 112a may match.

The end plates 240 and the pack side beams 270 fasten the plurality of large modules 250 at the same time, for example, through fastening of a bolt 280. Since the end plate 240 is made of a material having rigidity, the sub pack 260 becomes a unit structure having rigidity that is high enough to be regarded as the battery pack, and it is easy to handle, and facilitate the assembling of the battery pack B.

Conventionally, when mounting the battery module on the tray or replacing the battery module, it is necessary to align each battery module with the pack case and the crash beam in the front-rear and left-right directions, resulting in low operational performance. However, according to the present disclosure, it is easy to handle for each sub pack 260, resulting in high operational performance.

In this embodiment, to complete the 2×6 arrangement, two sub packs 260 are placed side by side along the X direction, i.e., the lengthwise direction of the battery cell. To satisfy arrangements other than the 2×6 arrangement, those skilled in the art may change the number of sub packs and the number of large modules included in the sub pack. As described above, the present disclosure treats the large module including two battery modules 200' as a unit of an array, and achieves various arrays through extension of one unit, thereby freely realizing the battery pack in various capacities.

As described above, in this embodiment, in particular, connection between the battery modules 200' in the sub pack 260 is established by the end plates 240, and thus the rigid structure necessary for the battery pack B is completed by the unit of the sub pack 260. In the same way as the previous embodiment, the battery pack B may further include the pack case 100 to maintain a hermetic function as a cover. Accordingly, it is possible to simplify the fabrication of the component/structure, and in particular, the component/structure of the pack case 100.

As mentioned previously, the conventional battery pack 1 has a spatial loss due to the gap between the battery modules 20, and the gap between the battery modules 20 and the pack case 10. The present disclosure does not need these gaps. When the large module 250 includes 48 battery cells, the simulation results show 9% increase in floor area ratio compared to the conventional battery pack 1 including the battery module 20 including 24 battery cells. According to the present disclosure, it is possible to increase the strength and floor area ratio of the battery pack.

Figure 13:
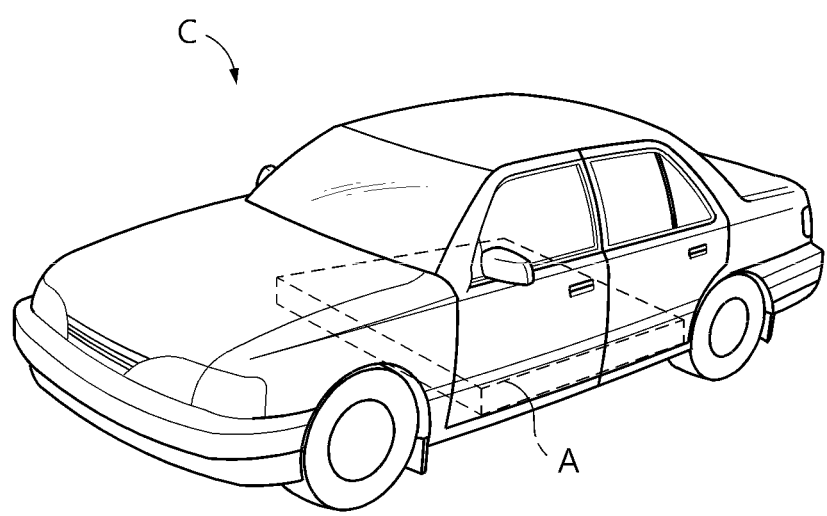
FIG. 13 is a diagram showing a vehicle according to still another embodiment of the present disclosure.

FIG. 13 is a diagram showing a vehicle according to still another embodiment of the present disclosure.

Referring to FIG. 13, the vehicle C may include the battery pack A or the battery pack B of the previous embodiment. In the shown example, the vehicle C includes the battery pack A. The vehicle C may be an electric vehicle or a hybrid electric vehicle, a vehicle using the battery pack A as a source of fuel.

The vehicle C according to this embodiment includes the battery pack A of the previous embodiment, and includes all the advantages of the battery pack A of the previous embodiment. In addition to the vehicle C, obviously, the battery pack A may be provided in an energy storage device or other device or equipment using the battery pack A as a source of energy.

According to various embodiments as described above, there may be provided a battery pack with improved energy density and a vehicle including the battery pack.

While the preferred embodiments of the present disclosure have been hereinabove shown and described, the present disclosure is not limited to the above-described specific preferred embodiment, and it is obvious to those skilled in the art that many modifications may be made thereto without departing from the subject matter of the present disclosure set forth in the appended claims, and such modifications fall in the scope of the appended claims.

It is noted that the terms indicating directions as used herein such as upper, lower, left, right, front and rear are used for convenience of description only, and it is obvious to those skilled in the art that the term may change depending on the position of an observer or the stated elements.

What is claimed is:

1. A battery pack comprising:
   plurality of battery modules, each battery module including:
   a battery cell stack including at least one battery cell; and
   a pair of end plates abutting opposing sides of the battery cell stack on two sides in a lengthwise direction of the battery cell, and
   a pack case for receiving the battery module, the pack case including:
   a tray in which the battery module is coupled on an upper surface; and
   a top cover having an outer periphery which is coupled with an outer periphery of the tray on the upper surface of the tray when the battery module is received in the pack case,
   wherein each of the pair of end plates are monolithic and shared between the plurality of battery modules to integrally connect the plurality of battery modules.

2. The battery pack according to claim 1, wherein the battery module includes:
   a busbar frame assembled on the opposing sides of the battery cell stack;
   an insulating cover coupled to an outer side of the busbar frame; and
   a side plate coupled to an outermost battery cell of the battery cell stack,
   wherein the end plates are a plate-shaped structure that cover an outer side of the insulating cover.

3. The battery pack according to claim 1, further comprising:
   a sealing element interposed between the outer periphery of the tray and the outer periphery of the top cover.

4. The battery pack according to claim 1, wherein the top cover has, at the outer periphery, a fastening extension portion that is bent and extends in an outward direction of the battery pack for fastening to the tray, and a fastening element is inserted into the fastening extension portion.

5. The battery pack according to claim 4, wherein the tray has, at the outer periphery, a step that is bent from a mounting area of the battery module to match the fastening extension portion, and the step is coupled to the fastening extension portion by the fastening element at a sidewall disposed on the step.

6. The battery pack according to claim 5, wherein any one of the pair of end plates has a flange disposed between the fastening extension portion of the top cover and the step of the tray, so that the flange is positioned on the sidewall, and a fastening element is inserted into the flange.

7. The battery pack according to claim 6, wherein a fastening seat is formed at an end of the other of the pair of end plates, and a fastening element is inserted through the fastening seat into a bracket installed in the tray.

8. The battery pack according to claim 6, wherein a wire harness is disposed in a space between the top cover and the sidewall.

9. The battery pack according to claim 1, wherein the battery modules are arranged in a 2×n (n is 1 or greater) matrix in an X direction (the lengthwise direction of the battery cell)×Y direction on an X-Y plane, the battery modules placed side by side along the X direction are arranged such that terminals face each other, and the pair of end plates are shared between the battery modules placed along the Y direction.

10. The battery pack according to claim 9, wherein an end plate placed on an outer side of the battery pack among the pair of end plates has a flange disposed between the fastening extension portion of the top cover and the step of the tray so that the flange is placed on the sidewall, and a fastening element is inserted into the flange, and
   a fastening seat is formed at an end of an end plate on an inner side of the battery pack among the pair of end plates, and a fastening element is inserted through the fastening seat into a bracket installed in the tray.

11. The battery pack according to claim 1, wherein the battery module further includes:
   a busbar frame assembled on the opposing sides of the battery cell stack;
   an insulating cover coupled to an outer side of the busbar frame; and
   a side plate coupled to an outermost battery cell of the battery cell stack,
   wherein the two battery modules are coupled by a center plate to form a large module, and at least one large module is included in the battery pack.

12. The battery pack according to claim 11, wherein at least two large modules are arranged in a direction, and the pair of end plates are shared on an outer side of the insulating cover to form a sub pack.

13. The battery pack according to claim 12, wherein two sub packs are arranged along the lengthwise direction of the battery cell.

14. The battery pack according to claim 12, wherein an empty space is formed between adjacent large modules in the sub pack.

15. The battery pack according to claim 12, wherein a pack side beam is further coupled to an outer side of at least one of the pair of end plates.

16. A vehicle comprising the battery pack according to claim 1.

* * * * *